United States Patent [19]

Klatt

[11] Patent Number: 4,543,856
[45] Date of Patent: Oct. 1, 1985

[54] POWER OPERATED, REMOTELY CONTROLLED TRANSMISSION

[75] Inventor: Alfred Klatt, Wathlingen, Fed. Rep. of Germany

[73] Assignee: WABCO Fahrzeugbremsen GmbH, Hannover, Fed. Rep. of Germany

[21] Appl. No.: 352,431

[22] Filed: Feb. 25, 1982

[30] Foreign Application Priority Data

Mar. 7, 1981 [DE] Fed. Rep. of Germany ....... 3108781

[51] Int. Cl.⁴ ...................... B60K 41/08; F16D 67/00; F16D 23/10; F16D 11/00
[52] U.S. Cl. ......................................... 74/866; 74/867; 192/3.58; 192/3.62; 192/103 F; 192/109 F
[58] Field of Search .................... 192/3.58, 3.61, 3.62, 192/109 F, 103 F; 74/364, 365, 346, 866, 867, 335, 336 R

[56] References Cited

U.S. PATENT DOCUMENTS

| 3,530,668 | 9/1970 | Siebers et al. | 74/866 X |
| 3,818,776 | 6/1974 | Prenzel et al. | 192/109 F X |
| 3,834,499 | 9/1974 | Candellero et al. | 192/3.58 X |
| 3,946,842 | 3/1976 | Siebers et al. | 192/3.58 |
| 4,019,614 | 4/1977 | Prenzel et al. | 192/103 F |
| 4,106,367 | 8/1978 | Bouvet | 74/866 |
| 4,324,322 | 4/1982 | Sibend | 192/3.61 X |
| 4,373,619 | 2/1983 | Schritt et al. | 74/866 X |
| 4,388,845 | 6/1983 | Kishi et al. | 74/866 X |

Primary Examiner—Allan D. Herrmann
Assistant Examiner—Stephen B. Andrews
Attorney, Agent, or Firm—G. J. Falce

[57] ABSTRACT

A remotely controlled automotive transmission shifting mechanism for effecting engagement of the respective gears with a force that varies in accordance with the gear selected. Pneumatic pressure from a compressed air storage tank is connected via a choke to a pneumatic actuating cylinder that effects gear engagement. A signal corresponding to the instantaneous pressure effective at the actuating cylinder is compared in an evaluating circuit with a reference value assigned to the gear selected. When the compared signals match, a solenoid valve is actuated to cut off further pressurization of the actuating cylinder and thereby modulate the gear actuating force in accordance with the gear selected. Following gear engagement, the gear actuating pressure is released.

5 Claims, 1 Drawing Figure

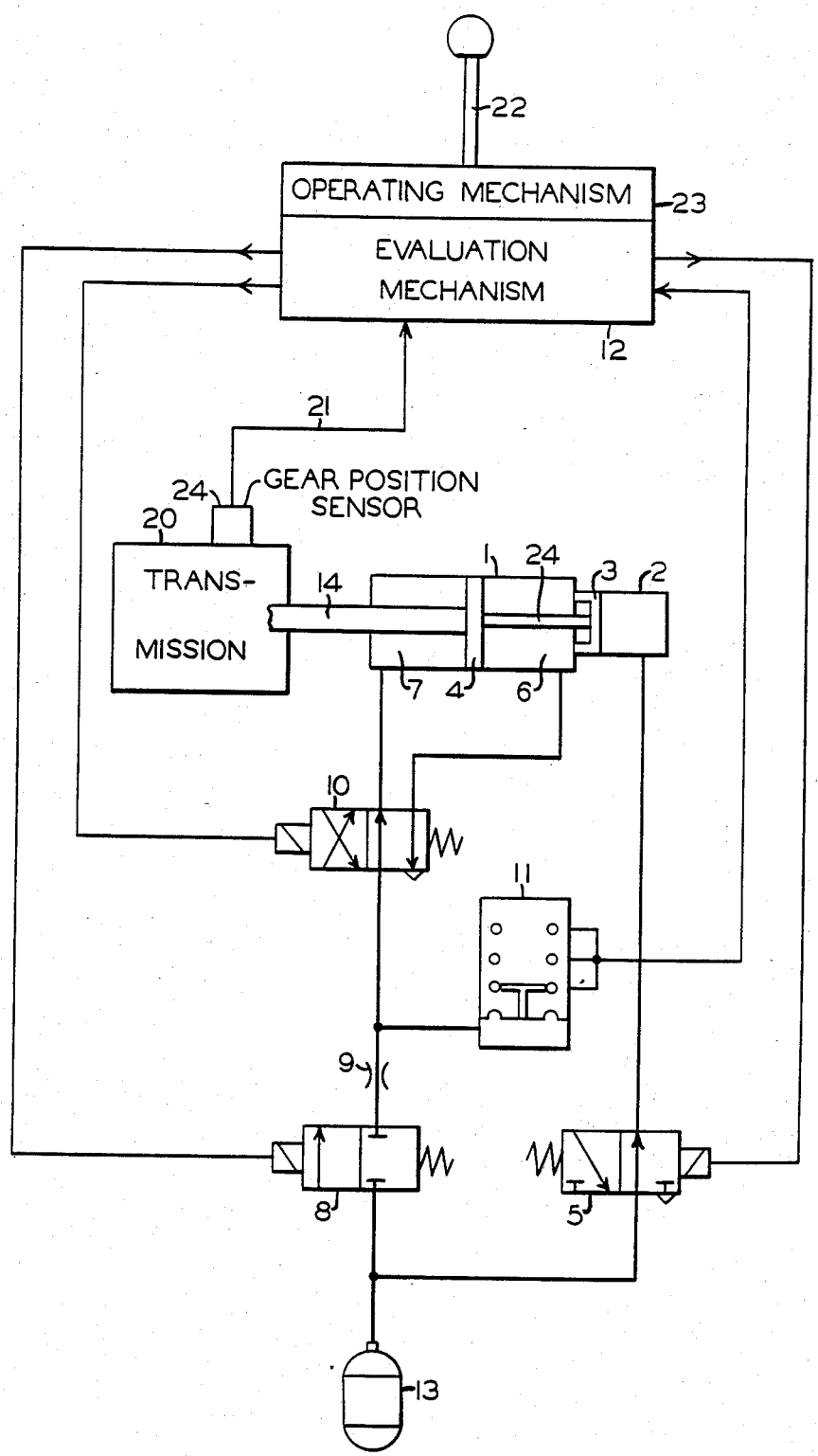

POWER OPERATED, REMOTELY CONTROLLED TRANSMISSION

BACKGROUND OF THE INVENTION

The invention relates to a transmission control activated by auxiliary power.

In trucks above a certain size, it is necessary to shift into the individual gears via remote control, i.e., with the operator controlled gearshift mechanism connected to the transmission by an auxiliary power unit. Compressed air is normally used as the auxiliary power. This carries various advantages along with it. While the force for shifting into the gears, which large transmissions require, is quite high, it is not necessary with a transmission activated by auxiliary power to locate the transmission directly below the gearshift lever.

In addition, there are other advantages, such as a constant activation force and the capability of installing the activation cylinders at suitable points in the transmission.

The gearshift control mechanism in motor vehicles is generally executed in an H-shaped arrangement. For large trucks, a transmission with 12 speeds is especially suitable. These speeds can, for example, be achieved by a main transmission having the gearshift control arranged in a double H configuration. The auxiliary gearshift may be provided to double the number of normal gears.

To shift the gears with a transmission with a double H gearshift control arrangement, two activation cylinders are necessary, namely, a transfer mode cylinder and a drive mode cylinder. The transfer mode cylinder is used to set the drive track with four positions for the speeds R (Reverse) 1/2, 3/4, 5/6.

The drive mode cylinder is used to set the speeds, with three positions for forward, reverse and neutral.

With auxiliary-power activated shifting of the gears, different actuating forces are required, according to the gear selected. This is a function of the speed necessary for synchronization which, for example, is the highest for the first speed. After the shifting of the gear has been accomplished, the force should cease, to protect the mechanism.

SUMMARY OF THE INVENTION

The object of the invention is to provide an auxiliary power-operated transmission control of the type described above, which exhibits a drive mode cylinder with three positions, and which can be securely placed in the midddle position, and which further allows a shifting of the various gears with different forces, to protect the mechanism.

BRIEF DESCRIPTION OF THE DRAWING

This object and other advantages of the present invention will become apparent from the following explanation when taken in conjunction with the single FIGURE drawing of a system schematic employing both symbols and labeled blocks representing conventional components.

DESCRIPTION AND OPERATION

A drawing is included for a more detailed explanation of a preferred embodiment of the invention, in which power means such as a drive mode cylinder 1 includes a piston 4 that acts via a piston rod 14 on a transmission 20. The drive mode cylinder 1 serves to engage the gears, and has three positions forward, neutral and reverse. To activate the drive mode cylinder 1, pneumatic pressure is supplied from a compressed air tank 13. Integral with the drive mode cylinder 1 is an auxiliary cylinder 2, whose piston 3 serves to fix the piston 4 in the middle position (neutral). First, second, and third valve means such as the respective solenoid valves 5, 8 and 10 serve to control the compressed air feed to the pressure chambers of the drive mode cylinder 1 and of the auxiliary cylinder 2. These solenoid valves are controlled by an electronic evaluating mechanism 12. The evaluating mechanism 12 receives data from the transmission 20 via a line 21 representative of the actual transmission speed and the gear selected, or the neutral position. In addition, data is received from a second sensing means, such as a pressure sensor 11 representative of the prevailing pressures in the pressure chambers 6 and 7 of the drive mode cylinder 1. In addition, the evaluation mechanism 12 receives information from a first sensing means, such as an operating mechanism 23 as to the gear to be shifted into. This information is derived from the position of a gearshift lever 22.

The transmission control illustrated in the figure operates as follows: for the (shown) middle position, the rear chamber 7 is supplied with a predetermined lower pressure than the pressure of the compressed air tank 13, the forward chamber 6 is depressurized, and the auxiliary cylinder 2 is supplied with the pressure existing in compressed air tank 13. For this purpose, first of all the solenoid valve 8 is switched to the open position and solenoid valve 10 remains in the position shown. Pressurization of the rear chamber 7 takes place gradually, on account of a choke 9, which is located in the supply line leading to valve 10, while chamber 6 is vented. After the predetermined reduced pressure is achieved in chamber 7, which is sensed by a pressure sensor 11, the latter gives a signal to the evaluation mechanism 12, whereby the solenoid valve 8 is switched into the holding position (shown). Concurrently, the auxiliary cylinder 2 is subjected to the complete pressure of the compressed air tank, and thus holds, by means of the piston 3 and a piston rod 24, the piston 4 of the drive mode cylinder 1 in the middle position (neutral position).

To shift into the forward position, the two-way/two-position valve 8 is shifted from its shown position and the four-way/two-position changeover valve 10 is switched from its shown position, so that the front chamber 6 of the drive mode cylinder 1 is pressurized, and the rear chamber 7 is vented. As mentioned above, it is advantageous to shift into the various speeds with different force. Thus, first gear requires the full force, and all of the higher gears require a progressively lower force. To achieve a pressure in the front chamber 6 which is lower than the supply pressure, once again the two-way/two-position valve 8 is reversed before the entire tank pressure is achieved, and thus the reduced pressure is maintained. The level of the reduced pressure depends, as mentioned above, on the gear being shifted into. In theory, therefore, the pressure to be applied is measured with the pressure sensor 11, and compared in the evaluation mechanism 12 with a reference value assigned to each gear to be applied. When these values are identical, the two-way/two-position valve is shut off by the evaluation circuit.

The shifting force can also be varied as a function of the speed of the transmission, or by a signal from the driver. In the latter case the driver, for example, can determine by means of a switch, that the transmission will be particularly protected by a pressure reduction or a slow shift. However, the driver can also eliminate the pressure reduction to accomplish rapid switching, if the shifting of the selected gear requires it.

Instead of measuring the pressure in the drive mode cylinder 1 by means of a pressure sensor 11, the limitation of the pressurization time can also be exercised by a timing element (not shown) included in the evaluation mechanism 12. This executes a reversal of the valve 8 after determined lengths of time set as a function of the gear being shifted into, and thus the desired pressure in the drive mode cylinder. In such an arrangement, the pressure sensor 11 is omitted.

Instead of supplying tank pressure on a continuous basis to drive mode cylinder 1, the pressurization can also be controlled by a pulse mechanism (not shown), which is included in the evaluation mechanism 12. This pulse mechanism interrupts the energization of the two-way/two-position valve 8 at regular intervals. This causes a slowing of the pressure increase in the drive mode cylinder 1, and a corresponding protection of the transmission 20. The pulsing rate can be influenced by the current gear position, the transmission speed or by the driver.

As a result of the changeover of the solenoid valve 10 into the position shown, after the gear has been shifted into, the front chamber 6 is vented, and thus the exertion of force is ended. This is advantageous for the protection of the mechanism, and is executed by a signal from third sensing means, such as a gear position sensor 24 associated with the transmission 20 to the evaluation mechanism 12 via line 21, and a corresponding signal from the evaluation mechanism to the solenoid valve 10. The venting can also take place with a time delay, to make sure that the gear has been actually engaged and to allow sufficient time to assure that valve 8 is shifted to its cut-off position. To shift into the rear position, in which the piston 4 is moved toward the right, in a corresponding manner, the rear chamber 7 of the drive mode cylinder 1 is briefly pressurized. For this, the auxiliary cylinder 2 must be vented by a switching of the valve 5. The setting of the desired pressure in chamber 7 for the desired gear shifting force takes place as described above.

Having now described the invention, what I claim as new and desire to secure by Letters Patent, is:

1. A power operated transmission control system comprising:
   (a) a transmission having different gears;
   (b) gearshift means having different positions for selecting the different gears of said transmission;
   (c) a source of fluid under pressure;
   (d) a power cylinder device comprising:
      (i) a first cylinder;
      (ii) a power piston operatively disposed in said first cylinder and forming in cooperation therewith a first pressure chamber on one side of said power piston and a second pressure chamber on the opposite side of said power piston;
      (iii) a first piston rod connected to said power piston and adapted to effect engagement of said transmission gears;
   (e) first sensing means for providing a reference signal that varies in accordance with the position of said gearshift means;
   (f) first valve means having a first position for establishing fluid pressure communication between said source and one of said first and second pressure chambers, whereby said power piston is actuated to effect engagement of said transmission gears by said rod, and a second position for interrupting said fluid pressure communication;
   (g) second sensing means for providing a feedback signal corresponding to the fluid pressure supplied to said one of said first and second pressure chambers;
   (h) evaluation means operative in response to said feedback signal being less than said reference signal for effecting operation of said first valve means to said first position, and operative in response to said feedback signal being at least equal to said reference signal for effecting operation of said first valve means to said second position, whereby the fluid pressure supplied to said one of said first and second pressure chambers and accordingly the force of engagement of said transmission gear is varied according to the gear selected;
   (i) second valve means interposed between said power cylinder and said first valve means and having a first position in which said fluid pressure communication is established with said one of said first and second chambers and a second position in which said one of said first and second chambers is vented;
   (j) third sensing means for providing a gear position signal that varies with the actual gear position of said transmission; and
   (k) said evaluation means being further operative in response to equality between said gear position signal and said reference signal for effecting operation of said second valve means to said second position, whereby said force of engagement of said transmission gear is relieved;
   (l) a positioning cylinder device comprising:
      (i) a second cylinder;
      (ii) an auxiliary piston operatively disposed in said second cylinder and forming in cooperation therewith a third pressure chamber; and
      (iii) a second piston rod connected to said auxiliary piston and adapted to engage said power piston; and
   (m) third valve means having a first position for establishing fluid pressure communication between said source and said third pressure chamber when said gearshift means is operative in a forward mode, whereby said second piston rod of said auxiliary piston engages said power piston to define a neutral position thereof from which neutral position said power piston is prevented from being actuated in response to pressurization of the other one of said first and second pressure chambers.

2. A power operated transmission control system as recited in claim 1, said third valve means further having a second position for venting said third pressure chamber of said positioning cylinder device whereby pressurization of the other one of said first and second pressure chambers of said power cylinder device causes actuation of said power piston such as to vary the force of engagement of said transmission gears in a reverse mode of operation of said gearshift means.

3. A power operated transmission control system as recited in claim 1, wherein said venting of said pressurized one of said first and second chambers is delayed until said first valve means is operated to terminate the supply of fluid pressure to said power cylinder device.

4. A power operated transmission control system as recited in claim 1, wherein said second sensing means is arranged to sense said fluid pressure supplied to said one of said first and second pressure chambers at a point between said first and second valve means.

5. A power operated transmission control system as recited in claim 1, further comprising a choke between said first valve means and said second valve means.

* * * * *